United States Statutory Invention Registration [19]

[11] Reg. Number: H273

Melvin et al. [43] Published: May 5, 1987

[54] PROCESSING OF HIGH SOLIDS PROPELLANT

[76] Inventors: William S. Melvin, Huntsville; Porter H. Mitchell, Fayetteville, both of Ala.

[21] Appl. No.: 937,803

[22] Filed: Dec. 1, 1986

[51] Int. Cl.[4] ..... C06B 29/22; C06B 33/06

[52] U.S. Cl. ..... 149/109.6; 149/2; 149/21; 149/42; 149/76

[56] References Cited

U.S. PATENT DOCUMENTS 3,022,149 2/1962 Cramer ..... 149/19

3,745,078 7/1973 Alley et al. ..... 149/76

*Primary Examiner*—John F. Terapane

*Assistant Examiner*—Eric Jorgensen

*Attorney, Agent, or Firm*—John C. Garvin; Freddie M. Bush

[57] ABSTRACT

The mixing of high solids loaded propellants is accomplished under reduced viscosity conditions by employing near critical liquid (NCL) carbon dioxide as the processing fluid in a volume amount from about 10 to about 20 percent of the volume of the propellant ingredients.

A typical propellant composition contains about 88 percent solids portion by weight comprised of ammonium perchlorate, aluminum powder, ballistic modifiers, and bonding agent and about 12 percent liquid portion by weight comprised of liquid polymers, plasticizers, and curatives.

NCL carbon dioxide facilitates low viscosity mixing of propellant ingredients in a completely inert processing fluid. The method allows the entire mixing procedure to be conducted under reduced temperature conditions (e.g., 90° F. vs 140° F.), and thereby, provides for extended propellant pot life. Pressure mixing in a range of 760 psig to 1000 psig enables carbon dioxide to be maintained as a NCL to assist propellant mixing. When propellant mixing is completed, depressurization of the mixing chamber enables the NCL carbon dioxide to undergo a phase change to its gaseous state. Venting to ambient conditions, releases the gas from the propellant composition. Residual amounts of dissolved carbon dioxide can be completely removed under vacuum prior to propellant casting. If desired, the gaseous carbon dioxide can be contained and recycled for further use.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESSING OF HIGH SOLIDS PROPELLANT

DEDICATORY CLAUSE

The invention described herein may be manufactured, used, and licensed by or for the Government for governmental purposes without the payment to us of any royalties thereon.

BACKGROUND OF THE INVENTION

Homogeneity of solid propellant compositions is essential for reliability in mechanical, chemical, and stability properties of the cured propellant grains. Instability of propellant grains can relate to a combination of mechanical and chemical property deficiencies due to improper mixing.

Mixing of high solids loaded ammonium perchlorate composite propellants to achieve homogeneity can be a time consuming costly, and hazardous procedure. The main disadvantages encountered in the preparation and mixing of these propellants are that their total liquid contents are generally very low and complete wetting of the solid oxidizer surfaces is slow and difficult to achieve. It is not unknown for a high solids loaded propellant containing ultrafine particles to require as much as three days time to properly incorporate all the solids into the final mix. When particulate solid oxidizers and fuels are subjected to the friction of the mixing blades in a high viscosity formulation the chance of a violent reaction being initiated is increased.

Cramer, U.S. Pat. No. 3,022,149 assigned to North American Aviation, Inc., discloses a "quick mix technique" which suggests that various processing fluids, such as hexane or Freon—113, be used to lower the overall mix viscosity and to help in wetting the surfaces of the solid ingredients which in order to lower labor and processing time. Wetting generally requires the displacement of adsorbed air and moisture from the surface of the solid particulates.

Further use of processing fluids, namely organic liquids in combination with a surfactant for the dispersion of fine ammonium perchlorate is taught in U.S. Pat. No. 3,745,078, issued to Bernard J. Alley et al. on July 10, 1973 and assigned to the United States of America as represented by the Secretary of the Army. The ammonium perchlorate must be insoluble in the organic liquid and the surfactant must be soluble in the organic liquid to achieve proper wetting to achieve desired results. After the functional benefit is derived, the processing fluids have to be removed. Complete removal of processing fluids is a drawback. Other, more serious drawbacks of most of these processing fluids are their high flammability and toxic natures. In addition, wide variances in final propellant ballistic and mechanical properties are likely to be encountered when using these types of processing aids if the processing aids are not completely removed. Chemical analyses periodically performed towards the end of the mixing procedure are usually required to provide assurance of complete processing fluid removal. This coupled with the difficulty of completely removing liquid processing aids complicates the process and increases processing time and costs.

Significant improvements in the processing of high burn rate, high solids loaded ammonium perchlorate propellants have been attained through the incorporation of aziridine ingredients which are added during the initial grinding of ammonium perchlorate crystals. Aziridines were found to reduce the rate of crystal growth and agglomeration of fine (less than 1 micrometer) ammonium perchlorate particles. Aziridines also were found to improve bonding of the binder matrix to the particles. These improvements in propellant processing and mechanical properties have been attributed to the surfactant properties of these materials. However, even under the best of conditions, the mixing procedure is still lengthy, costly, and hazardous.

An improvement in the method of mixing high solids loaded propellants to decrease labor costs and mixing time is a very desirable feature; however, an improvement which achieves not only a decrease in labor costs and mixing times, but derives other benefits such as mixing of the propellant in an inert atmosphere at lower temperature and lower viscosity conditions, would be welcomed results derived from an innovation to the propellant processing and mixing art.

An object of this invention is to provide a method of enhancing the mixing and processing of high solids loaded ammonium perchlorate composite propellants in a completely inert and non-flammable solvent system.

A further object of this invention is to provide a method of mixing and processing high solids loaded ammonium perchlorate composite propellants at a lower temperature which can provide extended propellant pot life.

Still, another object of this invention is to provide a method of mixing and processing high solids loaded ammonium perchlorate composite propellants wherein the mixing and processing are achieved with a near critical liquid which is easily removed after it completes its function by undergoing a liquid to gas phase change.

SUMMARY OF THE INVENTION

The mixing and processing of high solids loaded ammonium perchlorate composite propellants are facilitated with the use of carbon dioxide, as a processing fluid, when it is maintained under near critical liquid (NCL) conditions. Other gases, such as Freons, can similarly be used as processing fluids when subjected to NCL conditions. However, the use of NCL carbon dioxide, as a processing fluid, has the superior advantages of being non-flammable, non-toxic, non-polluting, and inexpensive. The use of NCL carbon dioxide provides the positive benefits of traditional liquid processing fluids without encountering their negative aspects. For example, the use of NCL carbon dioxide facilitates low viscosity mixing of propellant ingredients in a completely inert processing fluid. The entire mixing procedure is conducted under significantly reduced temperature conditions (e.g., 90° F. vs 140° F.) and, thereby, provides for extended propellant pot life. The mixing of propellant in liquid carbon dioxide, which requires pressures in the order to 760 psig to 1000 psig, is not a serious obstacle since all propellant safety operating procedures mandate remote operator mixing.

The propellant mixer is designed with a mixing bowl for operation under high pressure to achieve mixing of propellant in the range of 760 psig to about 1000 psig to maintain NCL conditions for gas selected for use. Maintaining NCL carbon dioxide facilitates wetting of the solid ingredient surfaces and can similarly allow surfactant additives to be used, if desired, to achieve improved propellant wetting and bonding. Upon completion of mixing, the carbon dioxide is totally removed by reducing the pressure through controlled venting and allowing the gas to escape after undergoing phase change. Thereafter, the mixed propellant can be processed using standard procedures. The carbon dioxide can be recycled, compressed, and re-adjusted to NCL carbon dioxide for use again as a processing fluid for mixing high solids loaded propellant.

DESCRIPTION OF THE PREFERRED EMBODIMENT

Mixing of high solids loaded ammonium perchlorate composite propellants is achieved by a less time consuming, less costly, and less hazardous procedure as described hereinbelow for the method of this invention as compared with the mixing procedure employing standard processing fluids.

The propellant mixer bowl is a standard propellant mixer designed for operating under high pressure or vacuum. The mixer is designed to accommodate pressures ranging from about 760 to 1000 psig with the ability of controlled venting.

Carbon dioxide and other gases such as Freons, when subjected to high pressures become liquids. The preferred processing fluid in accordance with the method of this invention is liquid carbon dioxide which is introduced into the propellant ingredients being mixed. The liquid carbon dioxide is maintained under near critical liquid (NCL) conditions during the mixing process.

The use of NCL carbon dioxide, as a processing fluid, has the superior advantages of being non-flammable, non-toxic, non-polluting, and inexpensive. NCL carbon dioxide provides the positive benefits of traditional liquid processing fluids without encountering many of their negative aspects. For example, the use of NCL carbon dioxide facilitates low viscosity mixing of propellant ingredients in a completely inert processing fluid. The entire mixing procedure is conducted under significantly reduced temperature conditions (e.g., 90° F. vs 140° F.) and, thereby is conducive to extended propellant pot life since the reactivities of the propellant ingredients are less at lower temperature.

A slurry mix of propellant solids containing 10 to 20% NCL $CO_2$ by volume is adequate to achieve the desired reduction in viscosity. The major limitation to the amount of NCL $CO_2$ actually added is governed only by the volume of the mixing bowl. The example set forth below illustrates a working range of propellant ingredients for the added 10 to 20% NCL $CO_2$ employed for reducing viscosity.

| Typical Propellant Composition For NCL $CO_2$ Mixing | Total Weight Percent |
|---|---|
| Solid Ingredients | |
| Ammonium Perchlorate | 88.0 |

-continued

| Typical Propellant Composition For NCL $CO_2$ Mixing | Total Weight Percent |
|---|---|
| Aluminum Powder | |
| Ballistic Modifiers | |
| Bonding Agent | |
| Liquid Ingredients | |
| Liquid Polymers | 12.0 |
| Plasticizers | |
| Curatives | |
| | 100.0 |

The solid propellant ingredients are slowly combined with the liquid polymers and plasticizers in a mixer designed for operation under high pressure in the range from about 760 psig to about 1000 psig. Compressed $CO_2$ is brought to the NCL state through appropriate temperature and pressure adjustments in the mixing apparatus. A temperature of about 90° F. and 760 psig for NCL $CO_2$ is an appropriate temperature-pressure combination. Other combinations are readily obtainable by reviewing critical temperature phase curves and predetermining the best combination for the composition being mixed.

The NCL carbon dioxide method of this invention permits propellant ingredients to be mixed in a completely inert and non-toxic processing fluid. Upon completion of mixing, the carbon dioxide can be totally removed by reducing the pressure through controlled venting and allowing the gas to escape. Being a gas at room temperature and pressure, the liquid carbon dioxide will readily volatilize and leave behind the mixed propellant in its entirety. No processing fluid residue will remain at the end of the mixing procedure and, therefore, this method obviates the need for chemical analyses as required with the use of traditional processing fluids.

We claim:

1. In a method of mixing a high solids loaded propellant composition having up to about 88 percent by weight solids comprised of ultrafine particles of ammonium perchlorate, aluminum metal powder, ballistic modifiers, and bonding agent, and having up to about 12 percent by weight liquids comprised of polymers, plasticizers, and curatives, the improvement which comprises employing near critical liquid carbon dioxide in a volume amount from about 10 to about 20 percent to accomplish mixing of the combined solid and liquid propellant ingredients under reduced temperature conditions of about 90° F. and under a total pressure from about 760 psig to about 1000 psig to maintain said carbon dioxide under near critical liquid during said mixing of said combined solid and liquid propellant ingredients to achieve a homogeneous solid propellant composition, and thereafter, reducing said pressure to effect a phase change of said near critical liquid carbon dioxide to gaseous carbon dioxide which is removed from said homogeneous solid propellant composition.

* * * * *